United States Patent [19]

Val

[11] Patent Number: 4,826,366
[45] Date of Patent: May 2, 1989

[54] CUTTING TOOL

[76] Inventor: George Val, Alte Buchserstrasse 14, Dällikon, Switzerland

[21] Appl. No.: 794,548

[22] Filed: Nov. 4, 1985

[30] Foreign Application Priority Data

Nov. 2, 1984 [CH] Switzerland .......................... 5300/84

[51] Int. Cl.⁴ .............................................. B23B 51/04
[52] U.S. Cl. ...................................... 408/185; 408/189
[58] Field of Search ................ 408/22, 23, 24, 26, 408/147, 153, 181, 184, 185, 226, 713, 182, 183

[56] References Cited

U.S. PATENT DOCUMENTS

| | | | |
|---|---|---|---|
| 2,838,316 | 6/1958 | Thomas | 408/181 |
| 3,468,197 | 9/1969 | Val | 408/147 X |
| 3,486,401 | 12/1969 | Kelm | 408/181 |
| 4,018,542 | 4/1977 | Lindsay | 408/181 X |
| 4,247,233 | 1/1981 | Kraemer | 408/185 |
| 4,500,233 | 2/1985 | Dehn | 408/185 |

FOREIGN PATENT DOCUMENTS

| | | | |
|---|---|---|---|
| 3343969 | 6/1984 | Fed. Rep. of Germany | 408/181 |
| 302177 | 3/1972 | U.S.S.R. | 408/181 |

*Primary Examiner*—Z. R. Bilinsky
*Attorney, Agent, or Firm*—Helfgott & Karas

[57] ABSTRACT

In a cutting tool with a head, a channel is formed through the head which receives a tool holder, the channel and holder extending perpendicular to the axis of rotation of the head. A screw in the head is provided to clamp the holder in any of a plurality of adjustment positions in the channel. A wall of the channel is recessed to accommodate part of an adjustment pin carried by the holder. The pin is internally threaded and receives a threaded spindle to form a spindle assembly which is adjustable from the outside.

12 Claims, 3 Drawing Sheets

Fig. 3
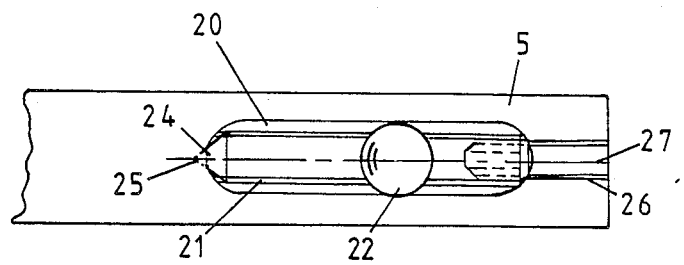
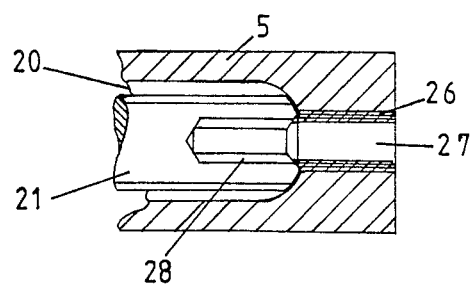
Fig. 4
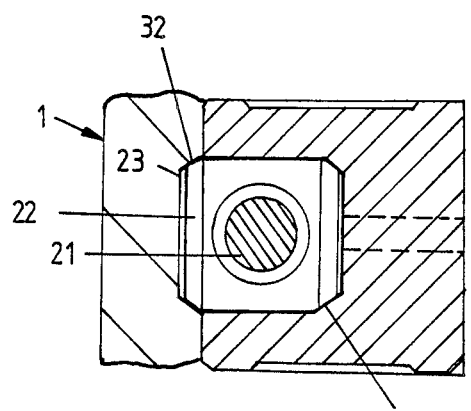
Fig. 5

CUTTING TOOL

This invention relates to a cutting tool with a head having a channel for accepting a movable and clampable support extending across the axis of rotation of the head and which at one end accepts a tool.

BACKGROUND OF THE INVENTION

One cutting tool of the type to which the invention relates is shown in Swiss Pat. No. 458,017. This cutting tool has high performance despite its modest dimensions and is capable of very quickly producing holes of various diameters in various materials. The only disadvantage turns out to be that the support for the drill tool is movable by first loosening a screw by hand. Further is the fact that despite a special setting gage the manual adjustment of the device remains inaccurate.

SUMMARY OF THE INVENTION

An object of the present invention is to improve the above described cutting tool especially so that the feed accuracy will be higher.

A further object is to provide such a tool in which the cutting tool need not be taken out of its support during the adjustment.

A further object is to make possible the largest possible adjustment range with minimum measurement.

Briefly described, a cutting tool in accordance with the invention includes a head having a channel or groove for receiving a holder which extends across the axis of rotation of the head, generally perpendicular to the axis, the holder being adjustable relative to the head and clampable in position. A work tool is held at one end of the holder. An adjustment pin or peg is received in a blind recess in the groove of the head. The adjustment pin is displaceable to adjust the tool and the holder is clamped in the groove.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 3 is a partial front view of a holder usable in the structure of FIGS. 1 and 2;

FIG. 4 is an enlarged partial view of the holder of FIG. 3, partly in longitudinal section;

FIG. 5 is a side elevation similar to FIG. 2 of a further embodiment of the invention;

DETAILED DESCRIPTION OF THE PREFERRED EMBODIMENTS

Figure 1:
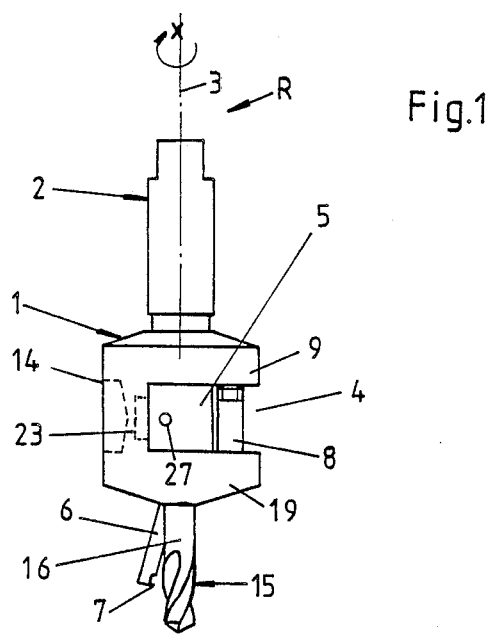
FIG. 1 is a side elevation of a cutting tool in accordance with the invention.

A cutting tool in accordance with the invention is indicated generally at R and includes a head 1 which is formed together with a shaft 2 from a single piece of steel. The shaft 2 is shaped in a conventional way so as to be received and held by the chuck of a boring machine or the like, not shown, so that the entire cutting head is rotatable about a central axis of rotation 3.

At a right angle to axis 3 a channel or groove 4 extends through head 1 across the middle of the head. Channel 4 serves to receive a holder 5 which is adjustable longitudinally with respect to itself and radially relative to the axis of rotation. At one end of the holder 5 is a cutting bit 6 with a cutter 7.

Holder 5 is clamped in the channel 4 by a threaded machine screw 8 which can be tightened to reduce the height of the channel, thereby clamping holder 5 in the channel. For this purpose, the threaded end of screw 8 is threaded into a internally threaded hole 11 in portion 9 of the head, best seen in FIG. 2, with the head 13 of screws 8 abutting a shoulder in a portion 12 of the head. Screw 8 thus extends parallel with the axis 3. In order that the clamping force exerted by screw 8 does not elastically deform the material of the head too greatly, a recess 14 is cut from the side of the head opposite channel 4, shown in dotted lines in FIG. 1, this recess also preventing or at least reducing unbalanced rotation at higher rotation speeds.

Opposite the shaft 2 in head 1 the smooth end shaft part 16 of a short drill 15 is inserted into the head. Drill 15 extends coaxially with the rotation axis 3. Shaft part 16 has an indentation 17 which cooperates with a small pin or peg 18. Peg 18 is pressed into indentation 17 by the head 13 of screw 8 so that by the tightening of screw the drill 15 is firmly gripped along with the clamping of holder 5.

Cutting bit 6 is mounted so that it slants backwards with respect to the direction of rotation, the angle of slope relative to a radial plane being between about 6 degrees and about 20 degrees but preferably between about 10 degrees and about 15 degrees. Cutting bit 6 is formed with a positive front relief angle and is ground from the rear so that it will not slide or rub on the groove wall and preferably shows a twist or spin. The full specification for constructing this above-described cutting bit can be found in Swiss Pats. Nos. 441,935 and 467,643. Because of the backward inclination the cutting bit is given a good spring action while the steel near the edge of the rear can get out of the way and so that the holder 5 will be free of torsional stresses.

Figure 2:
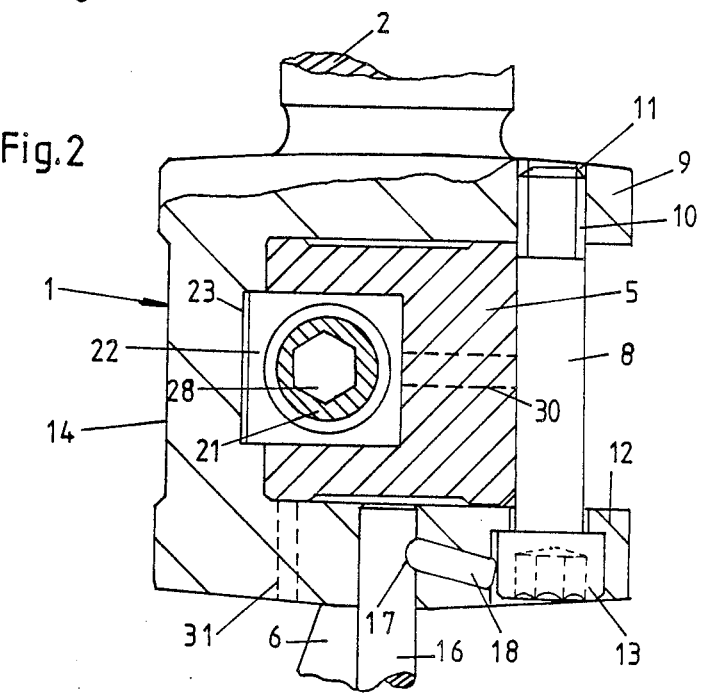
FIG. 2 is an enlarged partial side elevation of the tool of FIG. 1, partly cut away.
Figure 6:
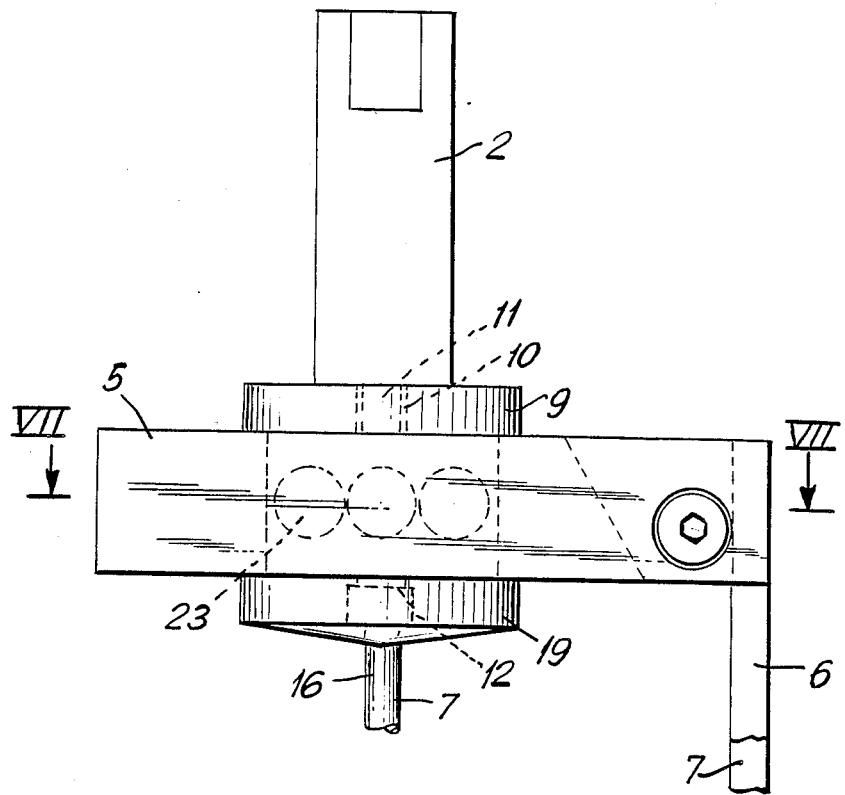
FIG. 6 is a side elevational view taken from the left side of the embodiment shown in FIG. 1.
Figure 7:
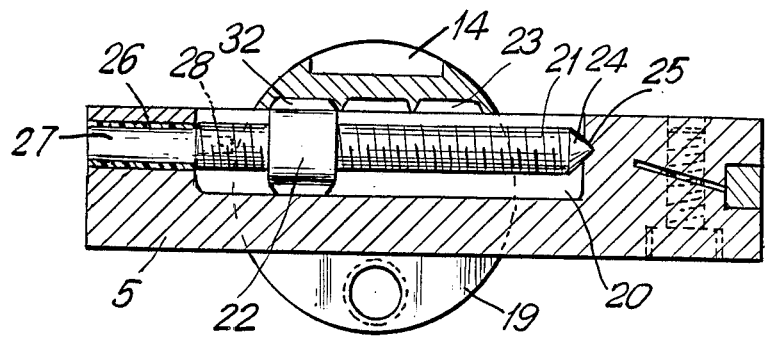
FIG. 7 is cross sectional view taken along lines 7—7 of FIG. 6.

In the holder 5 is, as shown in FIG. 3, an oval cavity 20 shaped to receive a spindle 21. Spindle 21 consists of a threaded pin the threads of which comb the internal screw threads of a fitted adjustment pin 22. Together these form a spindle assembly or unit. The adjustment pin 22 engages in the operating position as shown in FIG. 2, and in dotted lines in FIG. 1, in a blind recess 23 in head 1. In accordance with the invention, this blind recess 23 can be in about the middle of head 1 or it can be offset from the middle or it can be arranged as multiple recesses, as shown in FIGS. 6 and 7 the location of each being determined by a cutting calculation to support as desired the cutting tool R.

The spindle 21 engages a point 24 at one end of a central hole 25 in the cavity 20. The central bushing 26 as seen in FIG. 4 extends through a bore 27 in holder 5 and is preferably formed from a plastic material. A bore 28 in spindle 21 having a hexagonal interior is accessible respectively through bore 27 and central bushing 26 to a hexagonal key such as an Allen wrench. That tool also fits in the head of screw 8 which has a hexagonal recess and in a screw, not shown, in cutting bit 6. In addition this key can be inserted through a passage 30, shown in FIG. 2 in broken lines, to press out spindle 21 from cavity 20. Though this is an example of the simple possibilities, the spindle assembly to be replaced by another in order to obtain one with a different thread pitch. All operating functions are thus carried out with one key or tool, and, in addition, the entire cutting tool can be taken apart with this tool which greatly simplifies cleaning.

A further bore 31 permits drilling into holder 5 or insertion of a centering pin in an already provided bore in holder 5. By this technique the repeatable accuracy of a particular cutting in a given material can be assured.

For the relief of the adjustment of putting through the spindle 21 the adjustment pin 22 is accurately radially centered. It is therefore indifferent to how round is the inserted spindle assembly. In addition, as can be seen in FIG. 5, the adjustment pin 22 can be made with a conical contact area so as to make easier the fitting in to the recess 23 and also into cavity 20. The contact areas of the cavity and of the recess can be made to agree as shown by the flattened area 33. In this way a conical coupling is formed which makes easier the insertion of the adjustment pin 22 and if necessary to balance out existing accuracy of the fit.

Within the scope of the invention is the thought that the adjustment pin on one or both sides parallel to the spindle is flat. Therefore, the cavity can be required to be narrower and thus less material needs to be held. Also can the holder by remaining the same require that the cavity wall thickness be less, resulting in a weight reduction. Moreover, the cavity holds less dirt or cutting shavings.

Through these new arrangements is the cutting head made more adaptable. Also by clamping holder 5 can the spindle 21 be adjusted so part of the head 1 is relieved of pressure and the pressure point is located in the optimal range.

Because of the plastic central housing 26 the structure provides better guidance for the adjustable tool and an optimal adjustment feeling as well as better holding of the spindle in cooperation with the central bore 25.

The preferred symmetrically and conically cut adjustment pin is preferably provided with an internal thread through which spindle 21 is combed. The two together form a spindle assembly. By turning the spindle it is possible in a simple fashion to displace the holder forward or backward and thereby to determine the size of the cutout to be formed. The threads of the spindle and adjusting pin, respectively, can exhibit different slopes and in this fashion influence the feed advance.

The spindle itself rests in a cavity in the holder and can be ejected from this cavity to be replaced by a spindle with, for example, a spindle having a higher or lower thread slope without additional tools. With this one needs simply to loosen the clamping screw and the holder can be removed from the channel.

If it is desired in a simple way that the cut region of the cutting tool be changed, the blind recess can be arranged at different places in the base of the channel in the head. The invention also contemplates providing more blind recesses for a choice of positions.

The spindle sits, in another respect, in accordance with the invention, in the cavity at one end in a central bore and can be repositioned from the central bushing. This central bushing occupies a bore which with respect to the holder goes through the center of the tool and should be movable through a smaller measure. This construction makes the ejection of the spindle easier whereby upon insertion of a new spindle in the old position in the housing the spindle will be held in the same location.

While certain advantageous embodiments in accordance with the invention have been described in detail, it will be recognized by those skilled in the art that various changes and modifications can be made therein without departing from the scope of the appended claims.

What is claimed is:

1. A cutting tool comprising:
  a head having a central rotation axis and a C-shaped channel extending through said head transverse to said axis and opening to one side, said channel having upper and lower walls connected by a back wall, said back wall having a blind recess extending into said head transverse to said axis;
  an elongated holder displaceably received in said channel, said holder being slidable along said lower wall generally perpendicular to said central axis, said holder supporting a work tool at one end;
  clamping means on said head for clamping distal ends of the upper and lower walls of said channel to securely retain said holder in said channel with one side of said holder fitting contiguously against said back wall of said channel, said one side of said holder having a longitudinal cavity with an open face opening toward said back wall;
  an adjustable spindle assembly removably inserted as a form fit in said cavity through said open face and comprising an internally threaded adjustment pin positioned transversely across said cavity for engagement with said blind recess to fixedly position said pin with respect to said head, and an externally threaded longitudinal spindle coaxially position against opposing end walls of said cavity to provide said form fit, said spindle passing through said pin and engaging the threads therein for rotational movement therethrough to longitudinally move said holder with respect to said head; and
  an access opening extending through one end of said holder coaxial with said spindle through which opening said spindle is accessible to a key for rotation of said spindle.

2. A tool according to claim 1 wherein said blind recess is positioned along the center of said channel.

3. A tool according to claim 1 wherein said blind recess is positioned offset from the center of said channel.

4. A tool according to claim 1 wherein said adjustment pin has a symmetrical shape and said spindle is accurately centered therein so that said spindle assembly is insertable in said cavity.

5. A tool according to claim 1 wherein said adjustment pin is formed on opposite sides with conical contact surfaces.

6. A tool according to claim 1, wherein said adjustment pin is substantially cylindrical having a central axis transverse to said cavity, and having an internally threaded bore extending perpendicular to its central axis for receiving therein said spindle.

7. A tool according to claim 1 and including a plurality of blind recesses arranged along said channel.

8. A tool according to claim 1, and further including a bushing inserted in said access opening and made of resilient material.

9. A tool according to claim 1, wherein said spindle comprises a point at one end thereof, and said cavity includes a centering hole at the end opposite said access opening to receive said point to facilitate positioning and removal of said spindle assembly into and out of said form fit.

10. A tool according to claim 1, wherein said holder includes a bore transversely leading into said cavity for accommodating means for ejecting said spindle assembly from said cavity.

11. A tool according to claim 1, wherein said head includes at least one bore for receiving an alignment pin to establish a predetermined position of said holder.

12. A tool according to claim 1, wherein said adjustment pin is formed on opposite sides with conical contact surfaces, and said blind recess is formed with a contact surface corresponding to at least one of said pin conical surfaces.

* * * * *